(12) United States Patent
Hattori et al.

(10) Patent No.: US 7,876,500 B2
(45) Date of Patent: Jan. 25, 2011

(54) MICROSCOPE APPARATUS AND MICROSCOPE SYSTEM

(75) Inventors: Toshiyuki Hattori, Hachioji (JP); Tatsuo Nakata, Hino (JP); Yasunari Matsukawa, Saitama (JP); Akinori Araya, Yokohama (JP); Masaharu Tomioka, Hino (JP)

(73) Assignee: Olympus Corporation, Tokyo (JP)

( * ) Notice: Subject to any disclaimer, the term of this patent is extended or adjusted under 35 U.S.C. 154(b) by 299 days.

(21) Appl. No.: 12/059,043

(22) Filed: Mar. 31, 2008

(65) Prior Publication Data

US 2008/0246839 A1    Oct. 9, 2008

(30) Foreign Application Priority Data

Apr. 6, 2007    (JP) .............................. 2007-101006

(51) Int. Cl.
    *G02B 21/00*    (2006.01)
(52) U.S. Cl. ...................................................... 359/368
(58) Field of Classification Search ................. 359/368, 359/391

See application file for complete search history.

(56) References Cited

U.S. PATENT DOCUMENTS 6,584,287 B2 *    6/2003    Enomoto ..................... 396/311

| | | | |
|---|---|---|---|
| 2007/0298454 A1 * | 12/2007 | Green et al. | 435/34 |
| 2008/0030872 A1 * | 2/2008 | Nishioka et al. | 359/683 |
| 2008/0242558 A1 * | 10/2008 | Belcher et al. | 506/17 |
| 2009/0153659 A1 * | 6/2009 | Landwehr et al. | 348/135 |

FOREIGN PATENT DOCUMENTS

JP    2006-350005 A    12/2006

* cited by examiner

*Primary Examiner*—Frank G Font
(74) *Attorney, Agent, or Firm*—Holtz, Holtz, Goodman & Chick, PC

(57) ABSTRACT

It is possible to check for observation success or failure and the observation history without waiting for observation to be completely finished, thus saving time and energy required for observation, and avoiding lost opportunities for observation of precious samples etc. Provided is a microscope apparatus including an image acquisition unit for acquiring a plurality of frame images while varying a plurality of parameters; an image saving unit for successively saving the frame images acquired by the image acquisition unit; a property-information saving unit for saving property information in which identifying information of the saved frame images is associated with the parameters; and a control unit for controlling these units, wherein the control unit saves updated property information in the property-information saving unit each time the frame image is saved in the image saving unit.

10 Claims, 6 Drawing Sheets

FIG. 2

| G | G | G | | |
|---|---|---|---|---|
| T1Z1.tif | T2Z1.tif | T3Z1.tif | | |
| T1Z2.tif | T2Z2.tif | T3Z2.tif | | |
| T1Z3.tif | T2Z3.tif | T3Z3.tif | | |
| T1Z4.tif | T2Z4.tif | | | |
| T1Z5.tif | T2Z5.tif | | | |

```
T=1 : Z=1 : T1Z1.tif
T=1 : Z=2 : T1Z2.tif
T=1 : Z=3 : T1Z3.tif
............
T=3 : Z=1 : T3Z1.tif
T=3 : Z=2 : T3Z2.tif
T=3 : Z=3 : T3Z3.tif
```

MICROSCOPE APPARATUS AND MICROSCOPE SYSTEM

BACKGROUND OF THE INVENTION

1. Field of the Invention

The present invention relates to a microscope apparatus and a microscope system.

This application is based on Japanese Patent Application No. 2007-101006, the content of which is incorporated herein by reference.

2. Description of Related Art

As a known microscope system in the related art, there is a confocal microscope system, including a confocal scanner and an objective lens, which radiates laser light input to the confocal scanner onto a specimen via the objective lens of the microscope and performs time-lapse observation thereof; additionally, while shifting the focal position of the objective lens in the optical axis direction in each time-lapse period, it detects fluorescence from the specimen and constructs a three-dimensional slice image (for example, see Japanese Unexamined Patent Application, Publication No. 2006-350005).

In this microscope system, if observation success or failure is determined on the basis of the image which is three-dimensionally constructed after the observation is completely finished, it takes a long time to ascertain whether observation was a success or failure. In such cases where it is not possible to determine the observation success or failure until the observation is completely finished, it is not possible to retry observation according to the observation status; therefore, when observing precious samples for which re-observation is not viable, unsuccessful observation results in a serious missed opportunity. Thus, in Japanese Unexamined Patent Application, Publication No. 2006-350005, in order to avoid such missed opportunities, during acquisition of slice images of the specimen, a live image thereof is displayed, and a slice image of the specimen at a specified position in the optical axis direction is displayed during an idle period of each time-lapse observation.

Accordingly, by displaying an actually acquired live image during acquisition of the slice images and during idle periods, the microscope system disclosed in Japanese Unexamined Patent Application, Publication No. 2006-350005 allows the operator present on site to recognize whether time-lapse observation is currently underway, whether observation has been completed, or whether some problem occurs during observation. However, the microscope system disclosed in Japanese Unexamined Patent Application, Publication No. 2006-350005 has the following problems.

Specifically, when the time-lapse observation lasts for a long period of time, it is not realistic for the operator to constantly observe the display. Therefore, if an image considered to be normal is displayed when the operator checks the display, there is a drawback in that he or she cannot recognize a problem occurring temporarily during the observation prior to that point. In such a case, as a result, observation success or failure is first ascertained only after the long-term observation has completely finished; this is a problem particularly when observing precious samples because observation cannot be retried, resulting in a serious missed opportunity.

In addition, if a problem temporarily occurs at an initial stage of the time-lapse observation, the entire subsequent observation may be rendered meaningless because of that problem. Therefore, if such a problem is not noticed, the problem will first be recognized only after the long-term observation is completely finished, which is a drawback because it results in a significant waste of time and energy.

Furthermore, even when time-lapse observation is performed normally, it is desirable to be able to quickly ascertain the history of the slice image currently being displayed without waiting for the observation to be completely finished.

BRIEF SUMMARY OF THE INVENTION

The present invention provides a microscope apparatus and microscope system in which it is possible to check for success or failure of observation and the observation history without waiting until the observation is completely finished.

A first aspect of the present invention is a microscope apparatus including an image acquisition unit for acquiring a plurality of frame images while varying a plurality of parameters; an image saving unit for successively saving the frame images acquired by the image acquisition unit; a property-information saving unit for saving property information associating identifying information of the saved frame images with the parameters; and a control unit for controlling the image acquisition unit, the image saving unit, property-information saving unit, wherein the control unit saves updated property information in the property-information saving unit each time the frame images are saved in the image saving unit.

According to the first aspect of the present invention, by operating the image acquisition unit, a plurality of frame images are acquired while varying a plurality of parameters, and the acquired frame images are saved in the image saving unit; additionally, property information associating the identifying information of the frame images with the parameters is saved in the property-information saving unit. Therefore, by referring to the property information saved in the property-information saving unit, it is possible to ascertain the identifying information of the frame images associated with a plurality of parameters, and for each parameter, it is possible to extract the frame images saved in the image saving unit.

In this case, because the control unit saves updated property information in the property-information saving unit each time the frame image is saved in the image saving unit, the latest property information is saved in the property-information saving unit. Therefore, at an intermediate point during time-lapse observation or the like carried out over a long period of time, by referring to the property-information saving unit, the operator can extract the frame images acquired up to that point from the image saving unit using the parameters as a key. In other words, it is possible to check the already acquired frame images without waiting for the long-term time-lapse observation to be finished, and it is thus possible to quickly check for the occurrence of a temporary problem and the observation history.

In the first aspect of the present invention described above, the control unit may save the acquired frame images in the image saving unit each time one frame image is acquired by the image acquisition unit.

With this configuration, it is possible to extract frame images from the image saving unit in frame image units, and it is thus possible to always check up to the latest frame image.

In the first aspect of the present invention described above, the control unit may save a set of the acquired frame images in the image saving unit each time a complete set of the frame images for each parameter is acquired by the image acquisition unit.

With this configuration, it is possible to extract the set of frame images from the image saving unit in parameter units, and regarding parameters for which acquisition has been completed, it is possible to check the entire observation results thereof without waiting for acquisition of the set of frame images associated with parameters for which acquisition has not yet been performed.

A second aspect of the present invention is a microscope apparatus including an image acquisition unit for acquiring a plurality of frame images while varying a plurality of parameters; and an image saving unit for associating the frame images acquired by the image acquisition unit with the parameters associated with the frame images and successively saving the frame images each time one frame image is acquired by the image acquisition unit.

According to the second aspect of the present invention, a plurality of frame images are acquired while varying a plurality of parameters by operating the image acquisition unit and are saved in the image saving unit in a format where the acquired frame images are associated with parameters associated with those frame images. Therefore, by referring to the parameters saved in the image saving unit, it is possible to extract the frame images associated with that parameter from the image saving unit, for each parameter.

In this case, each time one frame image is acquired by the image acquisition unit, that frame image is saved in the image saving unit. Therefore, at an intermediate point during time-lapse observation or the like carried out over a long period of time, by referring to the parameters saved in the image saving unit, the operator can extract the frame images acquired up to that point from the image saving unit. In other words, it is possible to check the already acquired frame images without waiting for the long-term time-lapse observation to be finished, and it is thus possible to quickly check for the occurrence of a temporary problem and the observation history.

In the second aspect of the present invention described above, the image saving unit may save the acquired frame images with filenames using the parameters associated with the acquired frame images.

With this configuration, it is possible to easily extract frame images for each parameter simply by searching for a filename.

The second aspect of the present invention described above, may further include a parameter-specifying unit for specifying the parameters; an image extraction unit for extracting, from the image saving unit, a frame image associated with the parameters specified by the parameter specifying unit; and a display unit for displaying the frame image extracted by the image extraction unit.

With this configuration, the parameters are specified with the parameter-specifying unit, and by operating the image extraction unit, a frame image associated with the specified parameters is extracted from the image saving unit, and the extracted frame image is displayed by the display unit. Even at an intermediate point during time-lapse observation or the like carried out over a long period of time, the operator can check on the display unit the frame images, associated with the parameters, that have been acquired up to that point simply by specifying the parameters via the parameter-specifying unit.

In the second aspect of the present invention described above, the image extraction unit may extract all frame images associated with the parameters from the image saving unit; and the display unit may display all of the frame images extracted by the image extraction unit.

With this configuration, even at an intermediate point during time-lapse observation or the like carried out over a long period of time, the operator can check on the display unit all frame images, associated with the parameters, that have been acquired up to that point, simply by specifying the parameters via the parameter-specifying unit.

The second aspect of the present invention described above, may further include a prescribed-image-number storage unit for storing a prescribed number of acquisitions of the frame images associated with each parameter; and an already-acquired-image-number counting unit for counting an already acquired number of the frame images that are already acquired, wherein the display unit may display a complete set of frame images formed by combining the frame images extracted by the image extraction unit and predetermined proxy images whose number is obtained by subtracting the already acquired number from the prescribed number of acquisitions.

With this configuration, the complete set of frame images formed by combining the already acquired frame images and the proxy images is displayed on the display unit. The number of proxy images contained is obtained by subtracting the already acquired number counted by the already-acquired-image-number counting unit from the prescribed number of acquisitions of the frame images stored in the prescribed-image-number storage unit; therefore, the operator can easily ascertain up to what stage acquisition of the frame images has been performed in the entire long-term time-lapse observation by checking the size of the complete set of displayed frame images and the boundary between the frame images and the proxy images in that set of frame images. The proxy images are preferably luminance-free black images or images that can be clearly distinguished from the other frame images.

A third aspect of the present invention is a microscope system including a microscope apparatus including an image acquisition unit for acquiring a plurality of frame images while changing a plurality of parameters; an information storage device including an image saving unit for successively saving the frame images acquired by the image acquisition unit of the microscope apparatus and a property-information saving unit for saving property information associating identifying information of the saved frame images with the parameters; and a network for connecting the microscope apparatus and the information storage device, wherein the microscope apparatus is provided with a control unit for outputting the frame images acquired by the image-acquisition unit and the parameters and the property information associated with the frame images to the information storage device via the network, and the control unit outputs the frame images and the property information each time the frame images are acquired.

According to the third aspect of the present invention, the plurality of frame images acquired while varying the plurality of parameters by operating the image acquisition unit of the microscope apparatus are successively saved in the image saving unit of the information storage device connected to the microscope apparatus via the network; additionally, property information associating identifying information of the frame images with the parameters is saved in the property-information saving unit in the same information storage device.

Therefore, by referring to the property information saved in the property-information saving unit, it is possible to ascertain the identifying information of the frame images associated with the plurality of parameters, and it is thus possible to extract the frame images saved in the image saving unit, for each parameter. Accordingly, it is not necessary to use a large-capacity storage area in the microscope apparatus. In addition, the processing load is spread by dividing the system into the microscope apparatus for performing observation and the information storage device for saving the frame images and so on, and it is thus possible to confirm the frame images without impeding the observation procedure.

The present invention affords the following advantages: it is possible to check for success or failure of observation and the observation history without waiting for the observation to be completely finished, and it is possible avoid lost opportunities for observation of precious samples etc., while saving time and energy required for observation.

BRIEF DESCRIPTION OF THE SEVERAL VIEWS OF THE DRAWINGS

FIG. 2 is a diagram showing frame images acquired by the microscope apparatus in FIG. 1 and identifying information thereof.

DETAILED DESCRIPTION OF THE INVENTION

A microscope apparatus 1 according to an embodiment of the present invention will be described below with reference to FIGS. 1 to 4.

Figure 1:
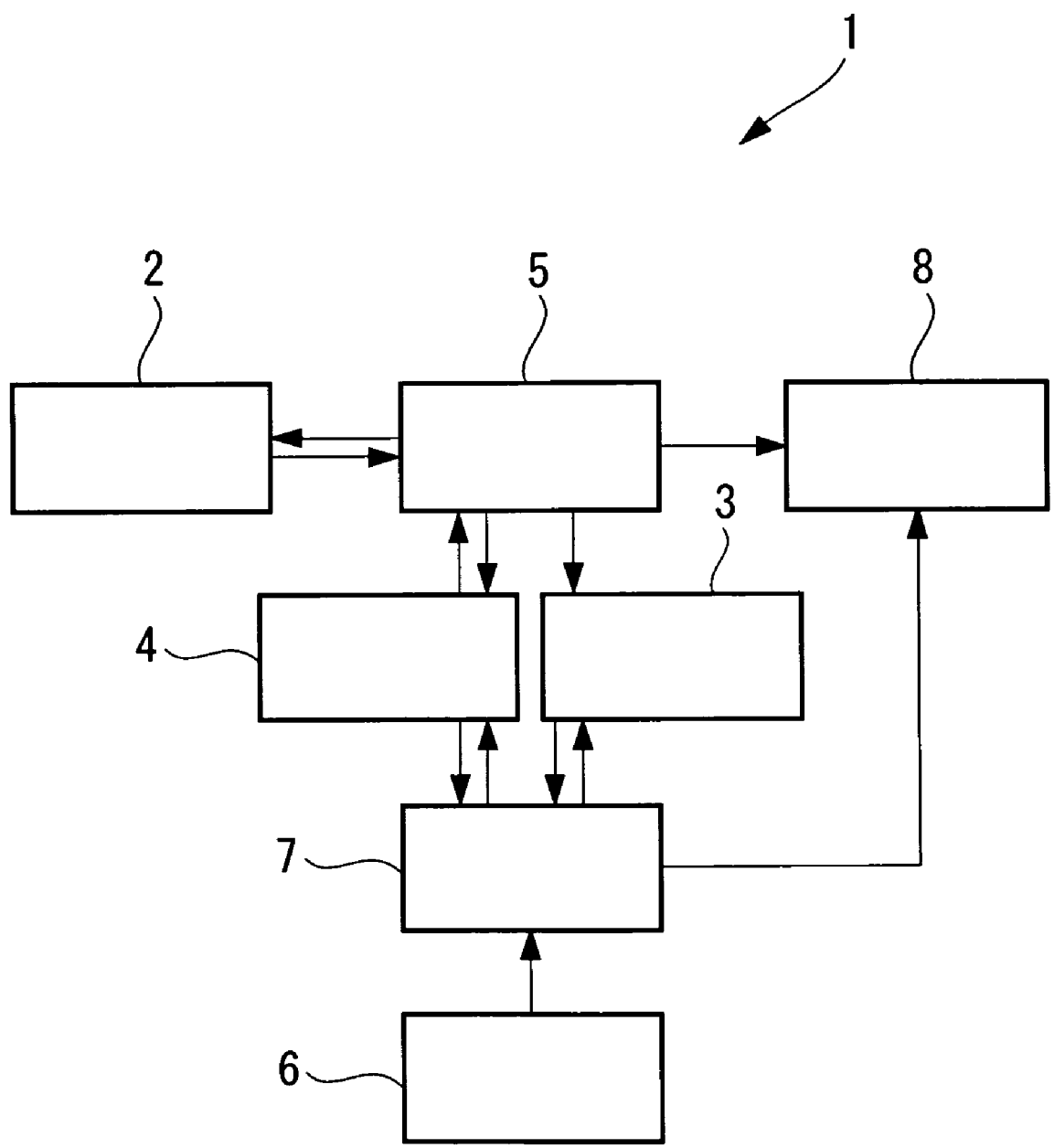
FIG. 1 is a block diagram showing a microscope apparatus according to an embodiment of the present invention.

As shown in FIG. 1, the microscope apparatus 1 according to this embodiment includes an image acquisition unit 2 for acquiring frame images while varying a plurality of parameters; an image saving unit 3 for successively saving the acquired frame images; a property-information saving unit 4 for saving property information associating identifying information of the saved frame images with the parameters; a control unit 5 for controlling the image acquisition unit 2, the image saving unit 3, and the property-information saving unit 4; a parameter-specifying unit 6 for specifying parameters; an image extraction unit 7 for extracting a frame image associated with the specified parameters from the image saving unit 3; and a display unit 8 for displaying the frame image extracted by the image extraction unit 7.

The microscope apparatus 1 is a microscope that can acquire three-dimensional slice images of a specimen, for example, a confocal microscope or a multiphoton-excitation microscope.

The image acquisition unit 2 acquires frame images of the specimen in predetermined time-lapse periods over a long period of time while varying a plurality of parameters, such as the wavelength of illumination light radiated towards the specimen, the position in the optical axis direction of a focal point of an objective lens relative to the specimen, the position in a direction orthogonal to the optical axis of the focal point of the objective lens relative to the specimen, the observation magnification, and so forth.

The image saving unit 3 saves a frame image G acquired by the image acquisition unit 2 together with identifying information thereof, or alternatively, as shown in FIG. 2 for example, with a filename using the identifying information.

The property-information saving unit 4 associates the parameters set when each frame image G is acquired with the identifying information of that frame image G and stores them. For example, in the examples illustrated in FIGS. 2 and 3, in an observation where an operation for acquiring five frame images G separated by intervals in the optical axis direction (Z direction) of the objective lens during one period is repeated for five periods separated by time intervals, with T defined as the period number and Z defined as the observation position in the optical axis direction, the values T=1 to 5 and Z=1 to 5 are defined as parameters.

Figures 3, 4:
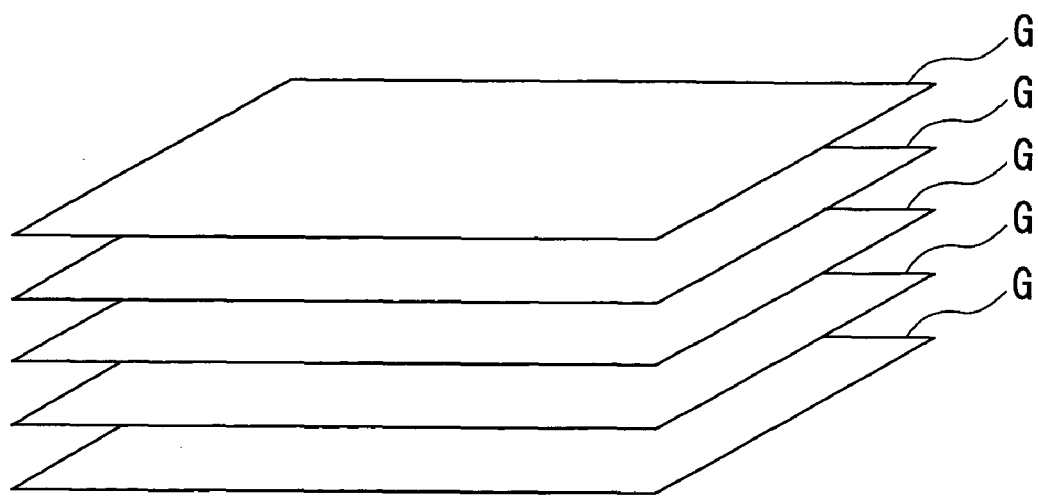
FIG. 3 is a diagram showing an example of property information stored in the microscope apparatus in FIG. 1.
FIG. 4 is a diagram showing a display example in a case where a plurality of frame images extracted on the basis of parameters are simultaneously displayed.

The state shown in FIGS. 2 and 3 is for acquiring up to the third frame image G in the Z direction in the third period. Additionally, in this example, the filenames of the frame images saved in the image saving unit 3 are given by the parameters.

The control unit 5 operates the image acquisition unit 2 according to parameters set in advance and displays the acquired live image on the display unit 8 each time a frame image G is acquired by the image acquisition unit 2.

Also, for each frame image G acquired by the image acquisition unit 2, the control unit 5 links the identifying information with the frame image G in question and saves them in the image saving unit 3.

At the same time, so that the property information associating the parameters with the identifying information linked with the frame image G is added to the previous property information saved in the property-information saving unit 4, the control unit 5 reads out the property information saved in the property-information saving unit 4 to create new property information and updates it by saving the newly created property information in the property-information saving unit 4.

The parameter-specifying unit 6, which is an input device such as a keyboard or a mouse, can specify parameters to be displayed on the display unit 8 when operated by the operator. The specified parameter from the parameter-specifying unit 6 may be a single parameter or a plurality of parameters specified by conditions such as AND/OR.

The image extraction unit 7 receives the parameter specified by the parameter-specifying unit 6, searches for the newest property information saved in the property-information saving unit 4 using that parameter as a key, and extracts the identifying information of the corresponding frame image G. The image extraction unit 7 searches for the frame image G in the image saving unit 3 using the extracted identifying information of the frame image G as a key, and extracts the corresponding frame image G.

When the display unit receives the frame image G extracted by the image extraction unit 7, it simultaneously or sequentially displays all extracted frame images G either by replacing the live image displayed, or simultaneously with the live image. When all extracted frame images G are simultaneously displayed, besides a thumbnail display in which individual frame images G are reduced and two-dimensionally arrayed, it is possible to select a three-dimensional display or the like in which frame images G displayed in a perspective view are arranged in a superimposed manner, as shown in FIG. 4.

With the thus-configured microscope apparatus 1 according to this embodiment, for each frame image G acquired by the image acquisition unit 2, the frame image G is saved in the image saving unit 3, and property information associating the parameters thereof with the identifying information of the frame image G is updated and stored in the property-information saving unit 4. Accordingly, merely by specifying a parameter via the parameter-specifying unit 6, the operator can display already acquired frame images G on the display unit 8, even at an intermediate point during observation carried out over a long period of time. In other words, it is possible to quickly confirm the observation results or history up to that point without waiting until the long-term observation is completely finished.

Therefore, if some kind of problem temporarily occurs at the initial stages of long-term observation, making it impossible to carry out normal observation, in particular, if subsequent observation would be meaningless due to such a problem, the operator, upon noticing that abnormal observation, can quickly stop the observation and try again. As a result, an advantage is afforded in that it is possible to prevent a waste of time and energy required for observation.

Even when observation is carried out normally, there are some instances where the operator, when looking at the live image displayed on the display unit 8, wishes to confirm the history concerning the state of that live image. In such instances, an advantage is also afforded in that it is possible to quickly check the already acquired frame images G without waiting until the long-term observation is completely finished.

In this embodiment, the filename formed by combining the parameters is saved in the image saving unit 3 as the identifying information of the frame image G. However, it is not limited thereto; it is also possible to set unique identifying information in each frame image itself, such as a serial number or any other number.

In this embodiment, the property information associating the parameters with the identifying information is stored in the property-information saving unit 4. Instead of saving the property information in this way, however, when frame images G are saved in the image saving unit 3 with filenames formed by combining parameters, the property-information saving unit 4 may be omitted because it is possible to search for a filename using the parameters.

In this embodiment, the period number and the Z-direction position were illustrated as examples of the parameters. However, they are not limited thereto; any other parameter, such as the wavelength of the illumination light, the position in a direction orthogonal to the Z-direction, the observation magnification, and so on, may be associated with the frame image G and saved.

In this embodiment, the identifying information is defined as the filename of the frame image G. Instead of this, however, the identifying information or the parameters may be contained in the frame image G as header information of the frame image G and saved in the image saving unit 3.

In this embodiment, the control unit 5 may include a prescribed-image-number storage unit (not shown in the drawings) for storing a prescribed number of acquisitions of the frame images G associated with each parameter and an already-acquired-image-number counting unit for counting an already acquired number of the frame images G that are already acquired; and it may be configured so as to display on the display unit 8 a complete set of frame images formed by combining the frame images G extracted by the image extraction unit 7 and black images (proxy images) B whose number is obtained by subtracting the already acquired number from the prescribed number of acquisitions.

Figure 5:
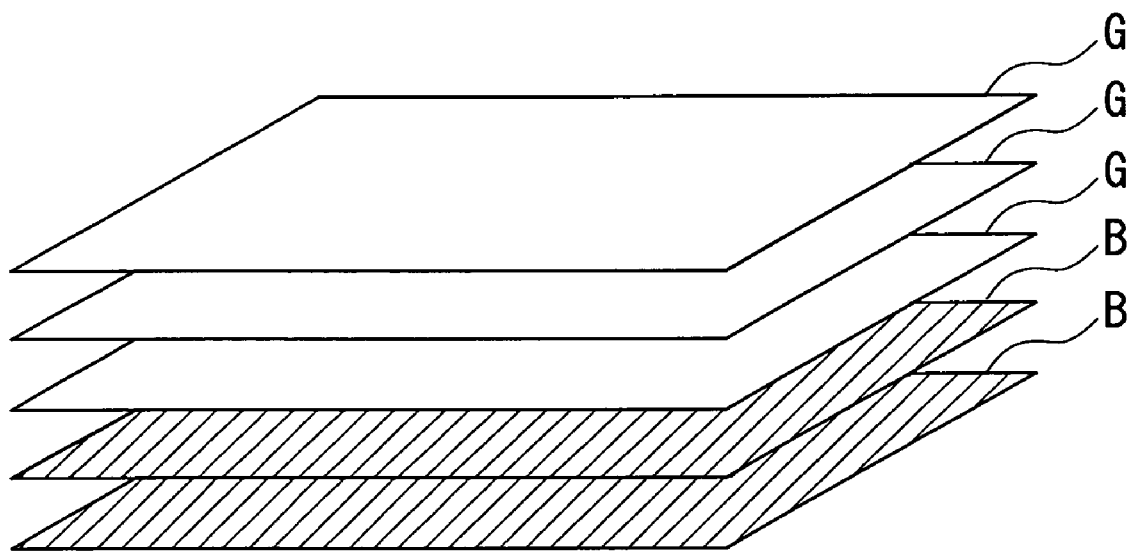
FIG. 5 is a diagram showing a display example in which black images are inserted at portions where frame images are not acquired.

For example, as shown in FIG. 2, when the period number T=3 is selected as the parameter, the three frame images G that have already been acquired are extracted. In this case, because it is determined in advance that five frame images G in the Z direction are to be acquired, an acquisition prescribed number of 5 is stored; and two black images B, whose number is obtained by subtracting the already acquired number of 3 of the frame images G that are already acquired, are combined with the three frame images G and are displayed as shown in FIG. 5.

By doing so, it is possible to confirm the size of the complete set of frame images for the specified parameter. Additionally, the boundary between the frame images G and the black images B enables easy visualization of the region of the already acquired frame images G in the complete set of frame images.

Besides using the black images B as the proxy images, it is possible to use any other type of image that can be clearly distinguished from the other frame images G.

In this embodiment, each time one frame image G is acquired, it is saved in the image saving unit 3, and the property information in the property-information saving unit 4 is updated. Instead of this, however, saving in the image saving unit 3 and updating of the property information may be carried out each time all frame images G for one parameter are acquired.

Figure 6:
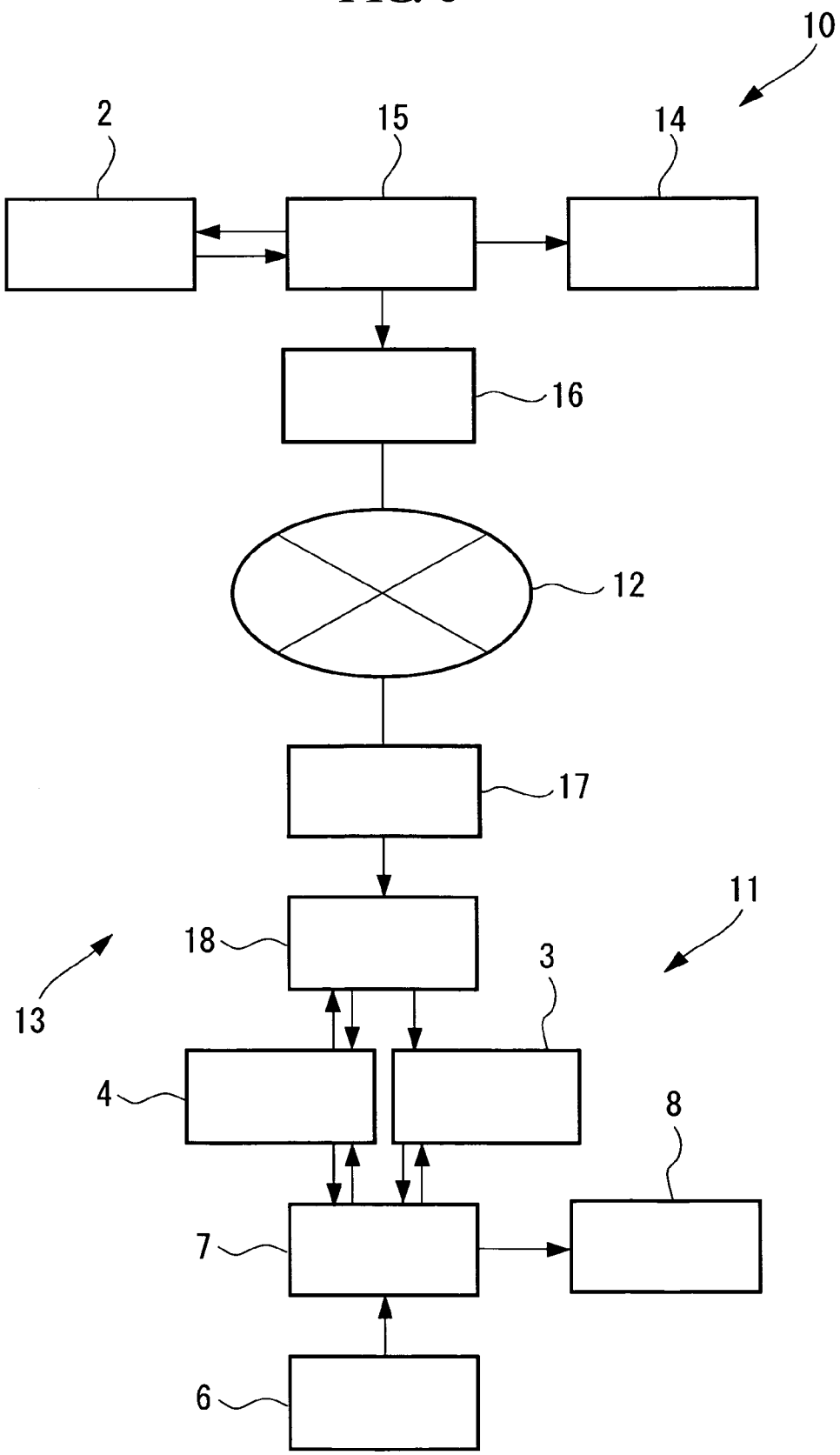
FIG. 6 is a block diagram showing a microscope system according to an embodiment of the present invention.

In this embodiment, control of the acquisition of the frame images G by the image acquisition unit 2 and saving and display of the acquired frame images G is performed by the single control unit 5. Instead of this, however, as shown in FIG. 6, it is possible to employ a microscope system 13 which is divided into a microscope apparatus 10 and an information storage device 11, which are connected to each other via a network 12.

The microscope apparatus 10 includes an image acquisition unit 2 for acquiring frame images G, a display unit 14 for displaying a live image, a first control unit 15 for controlling these units, and a communication unit 16 for sending the acquired frame image G and the parameters when that frame image is acquired. The information storage device 11 is provided with a communication unit 17 which receives the frame image G and the parameters sent via the network 12. A second control unit 18 creates property information using the parameters that the communication unit 17 receives and updates the property information stored in the property-information saving unit 4, and it also saves the sent frame image G in the image saving unit 3. The rest of the configuration is the same as described above.

With this configuration, it is not necessary to provide the microscope apparatus 10 with a large-capacity image saving unit 3. Also, because the microscope apparatus 10 does not perform processing for saving the frame image G, it is possible to spread and reduce the load placed on the first control unit 15, which affords an advantage in that it is possible to prevent interruption of a smooth image acquisition process.

Figure 7:
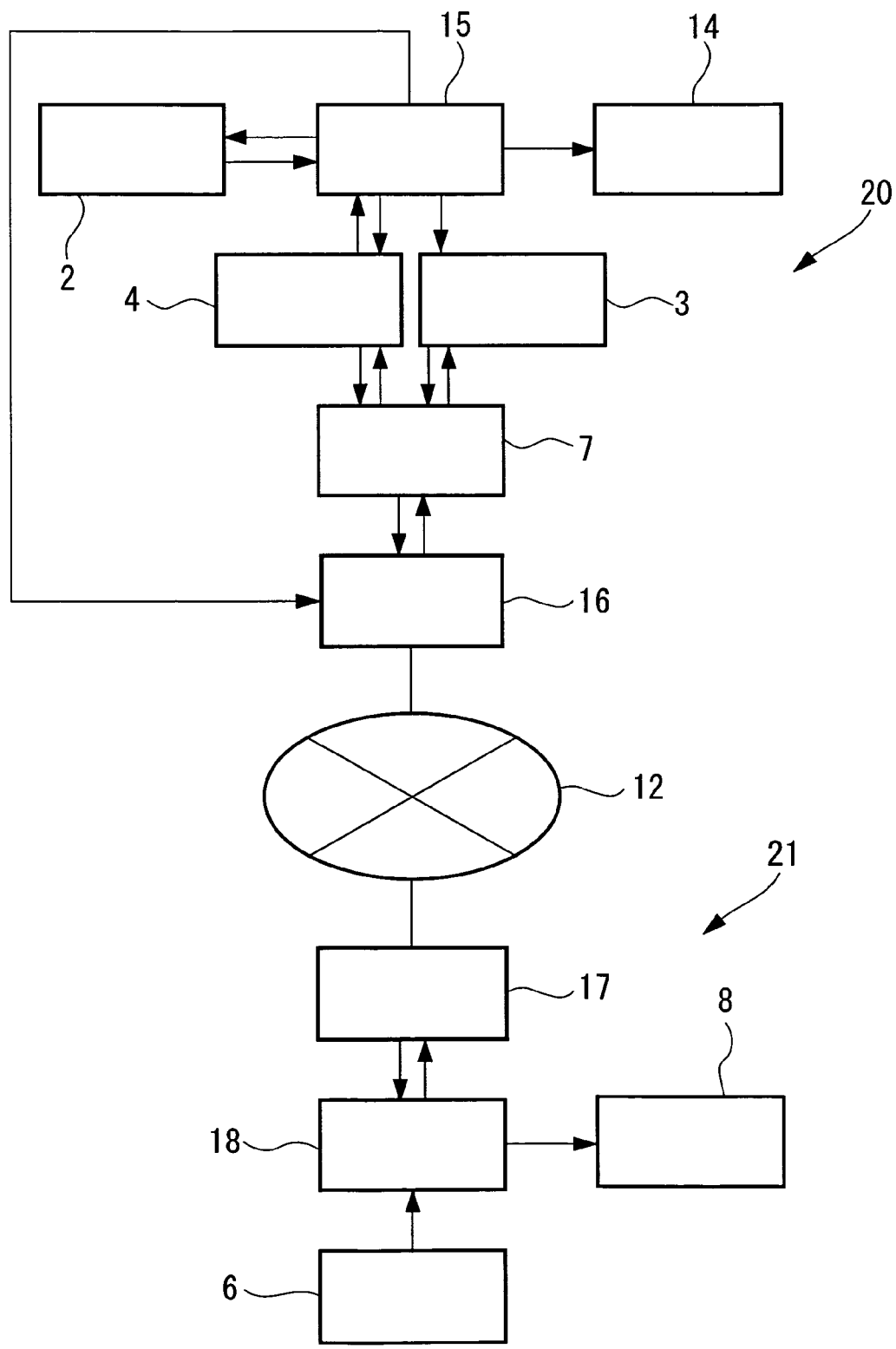
FIG. 7 is a block diagram showing a microscope system according to a modification of FIG. 6.

As shown in FIG. 7, the steps up to saving the acquired frame image G and the property information may be performed in a microscope apparatus 20, and the frame images saved in the image saving unit 3 of the microscope apparatus 20 may be displayed on the monitor 8 by an image display device 21 connected to the microscope apparatus 20 via the network 12.

In this case, the parameters specified in the parameter-specifying unit 6, which is provided in the image display device 21, are sent to the microscope apparatus 20 via the control unit 18, the communication unit 17, and the network 12; and in the image extraction unit 7 in the microscope apparatus 20, the frame images G is extracted from the image saving unit 3 using the sent parameters as a key. Then, the extracted frame image G is sent to the image display unit 21 via the communication unit 16 and the network 12 and is displayed on the display unit 8 by the second control unit 18.

By doing so, even when there is a large amount of traffic on the network 12, it is possible to realize time-lapse observation at fixed periods because it does not take a long time to save the acquired frame image G.

What is claimed is:

1. A microscope apparatus comprising:
an image acquisition unit for acquiring a plurality of frame images while varying a plurality of parameters;
an image saving unit for successively saving the frame images acquired by the image acquisition unit;
a property-information saving unit for saving property information associating identifying information of the saved frame images with the parameters;
a control unit for controlling the image acquisition unit, the image saving unit, and the property-information saving unit;
a parameter specifying unit for specifying a desired parameter;
an image extraction unit for extracting, from the image saving unit during the image acquisition, a frame image associated with the desired parameter specified by the parameter specifying unit; and
a display unit for displaying the frame image extracted by the image extraction unit during the image acquisition,
wherein the control unit saves updated property information in the property-information saving unit each time the frame images are saved in the image saving unit.

2. A microscope apparatus according to claim 1, wherein the control unit saves the acquired frame images in the image saving unit each time one frame image is acquired by the image acquisition unit.

3. A microscope apparatus according to claim 1, wherein the control unit saves a set of the acquired frame images in the image saving unit each time a complete set of the frame images for each parameter is acquired by the image acquisition unit.

4. A microscope apparatus according to claim 1, wherein:
the image extraction unit extracts all frame images associated with the specified desired parameter from the image saving unit; and
the display unit displays all of the frame images extracted by the image extraction unit.

5. A microscope apparatus according to claim 1, further comprising:
a prescribed-image-number storage unit for storing a prescribed number of acquisitions of the frame images associated with each parameter; and
an already-acquired-image-number counting unit for counting an already acquired number of the frame images that are already acquired,
wherein the display unit displays a complete set of frame images formed by combining the frame images extracted by the image extraction unit and predetermined proxy images whose number is obtained by subtracting the already acquired number from the prescribed number of acquisitions.

6. A microscope apparatus comprising:
an image acquisition unit for acquiring a plurality of frame images while varying a plurality of parameters,
an image saving unit for associating the frame images acquired by the image acquisition unit with corresponding parameters and successively saving the frame images each time one frame image is acquired by the image acquisition unit;
a parameter specifying unit for specifying a desired parameter;
an image extraction unit for extracting, from the image saving unit during the image acquisition, a frame image associated with the desired parameter specified by the parameter specifying unit; and
a display unit for displaying the frame image extracted by the image extraction unit during the image acquisition.

7. A microscope apparatus according to claim 6, wherein the image saving unit saves the acquired frame images with filenames using the parameters associated with the acquired frame images.

8. A microscope apparatus according to claim 6, wherein:
the image extraction unit extracts all frame images associated with the specified desired parameter from the image saving unit; and
the display unit displays all of the frame images extracted by the image extraction unit.

9. A microscope apparatus according to claim 6, further comprising:
a prescribed-image-number storage unit for storing a prescribed number of acquisitions of the frame images associated with each parameter; and
an already-acquired-image-number counting unit for counting an already acquired number of the frame images that are already acquired,
wherein the display unit displays a complete set of frame images containing a combination of the frame images extracted by the image extraction unit and predetermined proxy images whose number is obtained by subtracting the already acquired number from the prescribed number of acquisitions.

10. A microscope system comprising:
a microscope apparatus including an image acquisition unit for acquiring a plurality of frame images while varying a plurality of parameters, and a communication unit;
an information storage device including an image saving unit for successively saving the frame images acquired by the image acquisition unit of the microscope apparatus and a property-information saving unit for saving property information associating identifying information of the saved frame images with corresponding parameters;
a network for connecting the microscope apparatus and the information storage device; and
a control unit which controls the communication unit of the microscope apparatus to output the frame images acquired by the image-acquisition unit and the parameters and the property information associated with the frame images to the information storage device via the network, and
wherein the control unit controls the communication unit of the microscope apparatus to output the frame images and the property information each time the frame images are acquired.

* * * * *